(12) United States Patent
Marchetti et al.

(10) Patent No.: US 11,379,353 B1
(45) Date of Patent: Jul. 5, 2022

(54) PLATFORM FOR TEST ENVIRONMENTS

(71) Applicant: KURTOSIS TECHNOLOGIES, INC., Stow, OH (US)

(72) Inventors: Galen James Marchetti, Stow, OH (US); Kevin James Today, Houston, TX (US)

(73) Assignee: KURTOSIS TECHNOLOGIES, INC., Stow, OH (US)

( * ) Notice: Subject to any disclaimer, the term of this patent is extended or adjusted under 35 U.S.C. 154(b) by 0 days.

(21) Appl. No.: 17/344,761

(22) Filed: Jun. 10, 2021

(51) Int. Cl.
*G06F 11/36* (2006.01)
*G06F 9/455* (2018.01)
*H04L 67/133* (2022.01)
*G06F 8/36* (2018.01)

(52) U.S. Cl.
CPC ............ *G06F 11/3688* (2013.01); *G06F 8/36* (2013.01); *G06F 9/45558* (2013.01); *G06F 11/3664* (2013.01); *H04L 67/40* (2013.01)

(58) Field of Classification Search
None
See application file for complete search history.

(56) References Cited

U.S. PATENT DOCUMENTS

| | | | |
|---|---|---|---|
| 11,106,801 B1 * | 8/2021 | Levine | G06F 21/57 |
| 2020/0250074 A1 * | 8/2020 | Zhang | G06F 11/3688 |
| 2021/0311859 A1 * | 10/2021 | De Sousa Bispo | G06F 9/541 |

OTHER PUBLICATIONS

Kristiansen, "Running Tests in Containers", 2019, Published at https://freddysblog.com/2019/04/13/running-tests-in-containers/ (Year: 2019).*

* cited by examiner

*Primary Examiner* — Hossain M Morshed
(74) *Attorney, Agent, or Firm* — Law Offices of Alozie N. Etufugh, PLLC

(57) ABSTRACT

An orchestration platform/system for software test environments where holistic end-to-end tests are run with isolated testbeds of connected, containerized components for validating whole-system resilience to faults, regressions and real-world scenarios, is disclosed. Subnets within which tests are run are isolated from each other thereby guaranteeing reproducibility of tests to a much higher degree than previously possible.

19 Claims, 2 Drawing Sheets

PLATFORM FOR TEST ENVIRONMENTS

FIELD OF THE INVENTION

The present invention is directed to an orchestration platform for software test environments for running holistic end-to-end tests with isolated testbeds of connected, containerized components for validating whole-system resilience to faults, regressions and real-world scenarios.

BACKGROUND & SUMMARY OF THE INVENTION

Companies, notably blockchain development companies, typically conduct tests that check the resilience of their systems against hardware failures, attackers in their network, improper behavior of nodes in the network, and regression tests at the level of the entire system of distributed nodes. However, because such current testing platforms do not orchestrate regular and reproducible tests to be run when their code changed, there exists a need for a platform which could orchestrate testbeds necessary to run these tests.

SUMMARY OF THE INVENTION

Aspects of embodiments of the present invention create and manage ephemeral, virtualized network environments in which one environment is created and managed for each test. Because there is one environment per test, subnetworks are entirely isolated and reproducible, a feature that is critical for proper testing when running whole-system end-to-end integration tests. Users receive a fully featured Application Programming Interface (API) in programming languages of their choice, which allow for manipulation of the underlying network in addition to specification of test logic. These characteristics combine the test logic definitions with the orchestration and manipulation of the test environment itself, allowing developers to write holistic end-to-end tests without needing to mock external components with the same level of reproducibility and reliability they normally get with unit tests.

An aspect of an embodiment of the present invention contemplates a system for orchestration of software test environments, which may include: a hardware processor configured to perform a predefined set of basic operations in response to receiving a corresponding basic instruction selected from a predefined native instruction set of codes, memory, an entry point executable which may include a set of machine codes selected from the native instruction set for launching at least one container, an initializer container, which may include a first set of machine codes selected from the native instruction set for creating at least one subnet, a second set of machine codes selected from the native instruction set for coordinating execution and launch of at least one container, where the initializer container is launched by execution of the entry point executable, where at least one subnet is an orchestration environment within which to run desired tests, at least one testsuite container, which may include of a first set of machine codes selected from the native instruction set for starting at least one custom service for the at least one subnet, a second set of machine codes selected from the native instruction set for running tests within the at least one subnet, where the first and second sets of machine codes are generated by execution of instructions written by the user using a host software development kit (SDK), an API container which may include a set of machine codes selected from the native instruction set of codes for initializing, manipulating and tearing down the at least one subnet, and a client library which may include a set of machine codes selected from the native instruction set of codes for enabling interaction between the at least one testsuite container and the API container, where the at least one testsuite container, API container and client library are resident within the at least one subnet.

In an aspect of an embodiment of the present invention, the host SDK may include a set of machine code selected from the native instruction set which may include code for test logic definitions of the at least one subnet for conducting at least one test on the at least one custom service combined with code for orchestration and manipulation of the at least one subnet.

In an aspect of an embodiment of the present invention, the host SDK may further include a set of machine code selected from the native instruction set for defining core functionality, and a set of machine code selected from the native instruction set for enabling definition and manipulation of the at least one subnet.

In an aspect of an embodiment of the present invention, the testsuite and API containers may be launched by execution of the second set of machine codes of the initializer container.

In an aspect of an embodiment of the present invention, the launch of the API container and testsuite container may prompt the client library to instruct the API container on the composition of the at least one subnet.

Another aspect of an embodiment of the present invention contemplates a computer-implemented method of orchestrating software test environments, as executed on at least one processor configured to perform a predefined set of basic operations in response to receiving a corresponding basic instruction selected from a predefined native instruction set of codes, which may include the steps of: launch of an initializer container by execution of an entry point executable code, creation, launch and operation of at least one subnet, launch and operation of an API container, generation and operation of at least one testsuite container, generation of at least one custom service, and importation and execution of a client library, where execution of the client library enables interaction between the API container and the at least one testsuite container and where the API container, the at least one testsuite container, the client library and the at least one custom service are contained within the at least one subnet and where the at least one testsuite comprises of code for conducting at least one test on the at least one custom service.

In another aspect of an embodiment of the present invention, the computer implemented method may further include the step of enabling interaction between the client library and the API container.

In another aspect of an embodiment of the present invention, the step of operation of the at least one testsuite container may include the step of executing instructions written by the user using a software development kit (SDK), where the SDK may include a set of machine code selected from the native instruction set which may include code for test logic definitions of the at least one subnet for conducting at least one test on the at least one custom service combined with code for orchestration and manipulation of the at least one subnet.

In another aspect of an embodiment of the present invention, the SDK may further include a set of machine codes selected from the native instruction set for defining core functionality, and a set of machine codes selected from the native instruction set for enabling definition and manipulation of the at least one subnet.

In another aspect of an embodiment of the present invention, the step of operation of the API container may further include the step of interacting with a container generation platform in providing the testsuite with the at least one custom service.

In another aspect of an embodiment of the present invention, the step of operation of the testsuite container may further include the steps of: communicating with the API container, starting custom services to be tested and running code for testing the at least one custom service.

In another aspect of an embodiment of the present invention, the step of operation of the API container may further include the steps of initializing, manipulating and tearing down the at least one subnet.

A further aspect of an embodiment of the present invention contemplates a computer program product which may include a non-transitory computer readable medium having control logic stored therein for causing a processor configured to perform a predefined set of basic operations in response to receiving a corresponding basic instruction selected from a predefined native instruction set of codes to orchestrating software test environments, where the control logic may include computer readable code for: launch of an initializer container by execution of an entry point executable code, creation, launch and operation of at least one subnet, launch and operation of an API container, generation and operation of at least one testsuite container, generation of at least one custom service, and importation and execution of a client library, where execution of the client library enables interaction between the API container and the at least one testsuite container and where the API container, the at least one testsuite container, the client library and the at least one custom service may be resident within the at least one subnet and where the at least one testsuite comprises of code for conducting at least one test on the at least one custom service.

In a further aspect of an embodiment of the present invention, the computer program product may include computer readable code for enabling interaction between the client library and the API container.

In a further aspect of an embodiment of the present invention, the control logic for generation of the testsuite container may include computer readable code for executing instructions written by users in a software development kit (SDK), where the SDK may include a set of machine code selected from the native instruction set representing a combination of code for: test logic definitions of the at least one subnet for conducting at least one test on the at least one custom service and code for orchestration and manipulation of the at least one subnet.

In a further aspect of an embodiment of the present invention, the SDK may further include a set of machine code selected from the native instruction set for defining core functionality, and a set of machine codes selected from the native instruction set for enabling definition and manipulation of the at least one subnet.

In a further aspect of an embodiment of the present invention, the control logic for operation of the API container may include computer readable code for enabling the API container interaction with a container generation platform in providing the testsuite with custom services.

In a further aspect of an embodiment of the present invention, the control logic for operation of the testsuite container may include computer readable code for: communicating with the API container, starting custom services to be tested and running control logic for testing the custom services.

In a further aspect of an embodiment of the present invention, the control logic for operation of the API container may include computer readable code for initializing, manipulating and tearing down the at least one subnet.

An advantage of aspects of embodiments of the contemplated invention is the fact that the contemplated invention greatly improves the efficiency of writing, maintaining, and orchestrating end to end testbed environments for distributed systems.

Another advantage of aspects of embodiments of the contemplated invention is that they improve the functioning of the systems being tested by exposing failure modes which arise at the level of the entire system (end-to-end integration) rather than only exposing failure modes arising within each individual component.

Another advantage is that aspects of embodiments of the contemplated invention introduce a higher level of abstraction than existing testing processes. Aspects of embodiments of the contemplated invention test at the level of the entire system, and the aspects are able to do this by defining test environments as a collection of individual services. Existing processes focus on defining testing environments at the level of each service, and manipulation of the collection of services is done manually, outside of the test process. Because the test process, by aspects of embodiments of the present invention, define the collection of services as disclosed in this application, the amount of effort involved in conducting whole-system tests is significantly reduced. This enables developers to write tests that were previously prohibitively expensive.

Aspects of embodiments of the contemplated invention include definition and use of a programmatic SDK which developers are able to define connected systems of individual services, thus enabling them to test for complex failure modes and deployment environments with few lines of code, without writing extra code to maintain and orchestrate the execution of those test environments. Aspects of embodiments of the contemplated invention also define a test as unified with the testbed environment, so that developers access isolated and unique testbed environments for each test they write. This guarantees isolation and reproducibility of tests to a much higher degree than previously possible.

Aspects of embodiments of the contemplated invention are unique as they provide users/developers with programmatic tools with which to write end to end distributed systems in the same paradigm that component tests are written—in the native language of development. In which case, the test environment is intrinsically tied to the test itself, and with full capacity for the developer to control environment manipulation as well as testing logic.

Aspects of embodiments of the contemplated invention are unconventional in considering the orchestration of subnet environments and their manipulation to be fundamentally a part of the test itself, rather than a separate issue. This is the basis of the contemplated invention's architecture and the reason for the high-powered SDK and orchestration capabilities that the contemplated invention provides to users, while maintaining reproducibility and isolation between tests, which other systems are unable to do.

Aspects of embodiments of the present invention contemplate the use of special purpose or general-purpose computer system(s) that includes computer hardware such as processor(s) and system memory. These processor(s) may be configured to perform a predefined set of basic operations in response to receiving a corresponding basic instruction selected from a predefined native instruction set of computer executable code. Aspects of embodiments of the present invention may include a set of machine code selected from the native instructions set of the server(s)/processor(s) to perform specific functions and/or operations. As the native instructions set is a discrete code recognized by the hardware processor(s) which may be built into the hardware processor(s) and presents the way the system communicates with the hardware processor(s). In an aspect of an embodiment of the present invention, the native instructions set specify certain registers for arithmetic, addressing and/or control functions. In addition, the native instructions set can specify addressing modes which are utilized to interpret operands. Combination and/or permutations of the different native instructions may be done for more complex computer operations or functionality. Aspects of embodiments of the present invention contemplate the use of such special purpose or general-purpose computer system(s) in the implementation of the contemplated invention herein by execution of machine code discussed above.

Aspects of embodiments contemplate computer program product stored on computer-readable media for carrying or storing computer-executable instructions and/or data structures. Such computer-readable media can be any available media that can be accessed by a general-purpose or special-purpose computer system. Such computer-readable media may include, but not be limited to, physical storage media that store computer-executable instructions and/or data structures, of which may include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures. these can be accessed and executed by the general-purpose or special-purpose computer system to implement the disclosed functionality of the invention.

Computer-executable instructions comprise, for example, instructions and data which, when executed by the processor(s), cause a general-purpose computer system, special-purpose computer system, or special-purpose processing device to perform a certain function or group of functions. Computer-executable instructions may be, for example, binaries, intermediate format instructions such as assembly language, or even source code.

Aspects of embodiments of the present invention contemplate the use of "containers", which are essentially units of software that encompass executable machine code selected from the native instruction set and all related dependencies. A container, by this structure (i.e., the packaging of the executable machine code with its dependencies), thereby enables an application to run quickly and reliably from one computing environment to another. Aspects of embodiments of the present invention also contemplate the use of platforms that generate containers, such as Docker. Containers as also contemplated by aspects of embodiments of the present invention, may include all the tools the software code needs to run an application including, without limitation: system tools, runtime, code, library, settings, etc.

BRIEF DESCRIPTION OF THE
FIGURES/PICTURES

Figure 1:
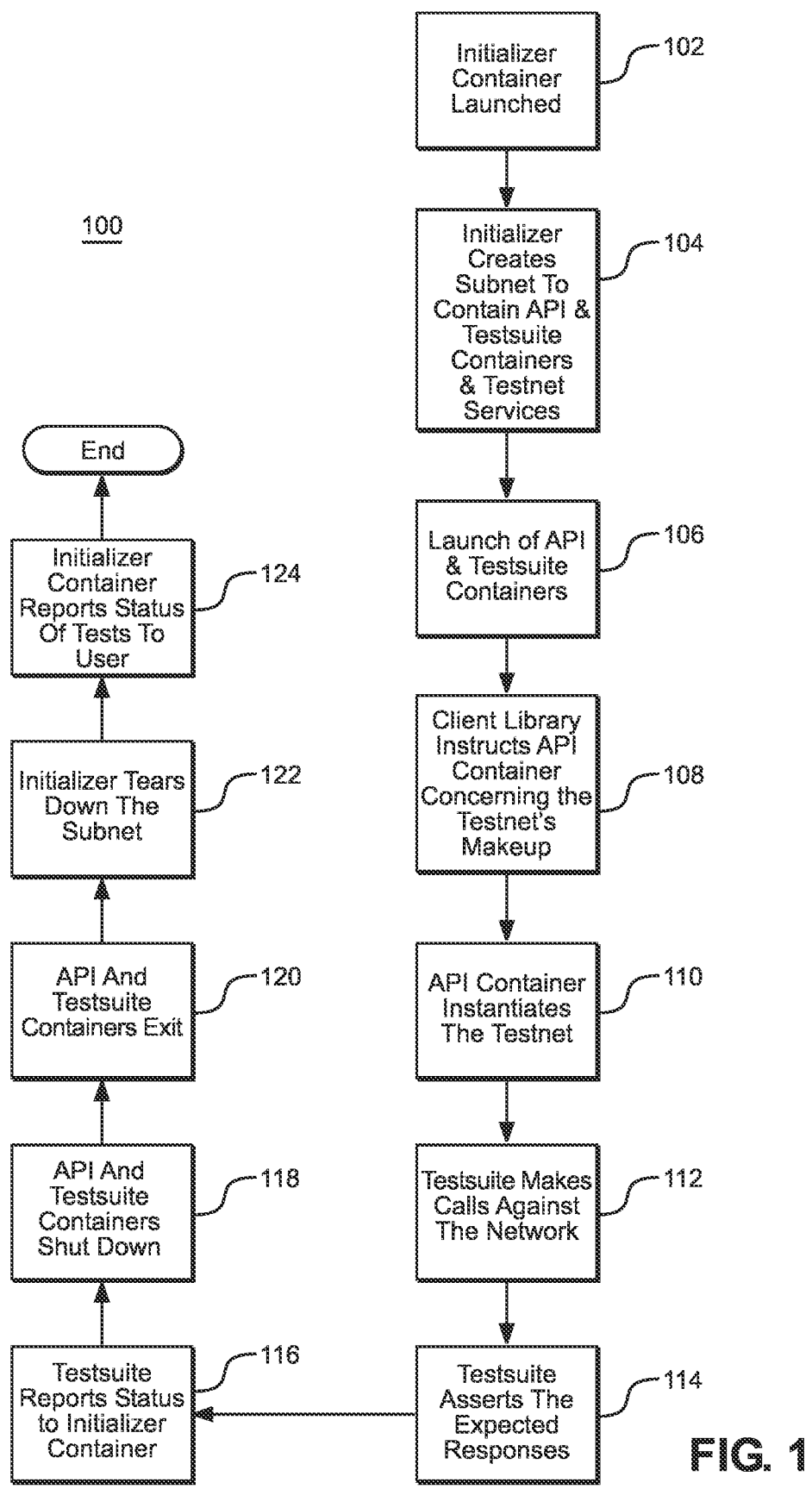
FIG. 1 illustrates a process flow 100 according to an aspect of an embodiment of the present invention.
Figure 2:
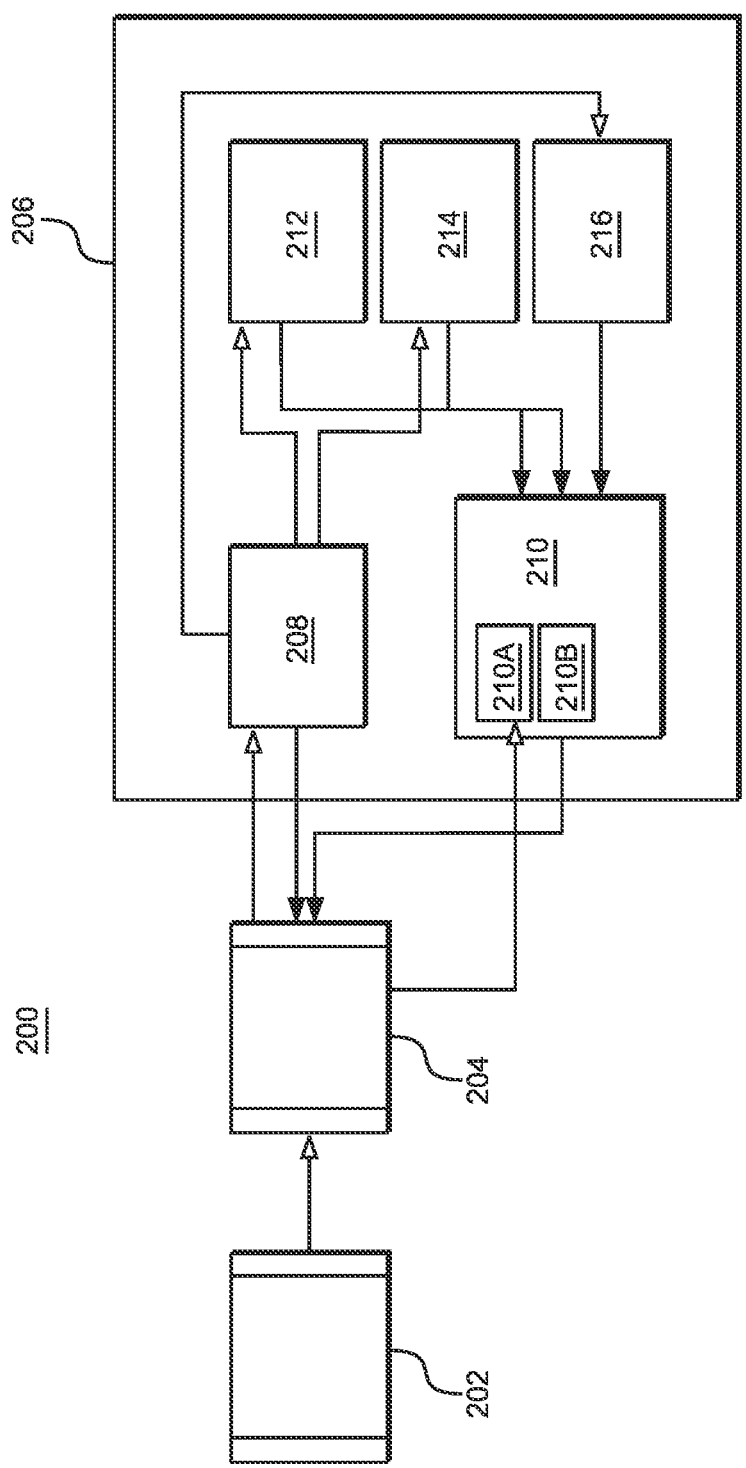
FIG. 2 illustrates system architecture 200 according to an aspect of an embodiment of the present invention.

Referring now to FIGS. 1-2 a process flow 100 along with the constituent components of process flow 100 and system architecture 200 are shown according to aspects of embodiments of the present invention. Aspects of embodiments of the present invention contemplate the implementation of each step of process flow 100 by way of execution of executable code by processor(s).

Process flow 100 starts, in step 102, with the launch of initializer container 204 following execution of entry point executable code 202 by a processor (not shown). Initializer container 204 is the container that coordinates execution and/or launch of the testsuite(s). Next, in step 104 initializer container 204, upon execution, creates subnet 206 which, in an aspect of an embodiment of the present invention, is an orchestration environment within which desired tests may be run. It should be noted that disclosure of subnet 206 is only illustrative and not limiting, as aspects of embodiments of the present invention contemplate the creation of one or more subnets. In an aspect of an embodiment of the present invention, each subnet is a subnet for every test bed where each subnet is a network in which the respective test bed operates. An aspect of an embodiment of the present invention contemplates the isolation of each subnet from other subnets. Components within each subnet, however, are able to communicate with each other. Initializer container 204 acts as the master interface through which a user of the contemplated invention commissions the desired tests to be simulated. Once the user commissions the tests to be conducted or simulated in step 104, the initializer container 204 proceeds to create subnets for each set of tests within their respective separate subnet.

In aspects of embodiments of the present invention where reliance is placed on platforms that provide and/or assist in the generation of containers such as Docker, initializer container 204 acts as the interface between the contemplated invention and the container platform. Such platforms provide the tooling necessary to simulate computers or computer operations on a subscriber's or user's computer system. Platforms such as Docker provide the containers which isolate environments, so that embodiments of the present invention can simulate different testing procedures on the user's computer without interference from each other.

Subnet 206, as created by initializer container 204, in step 104 of Process 100, includes application programming interface (API) container 208, testsuite container 210, and subnet custom services 212, 214 and 216. It should be noted that disclosure of subnet custom services 212, 214 and 216 is illustrative only and not meant to be limiting as fewer or more custom services are contemplated by aspects of embodiments of the present invention. Testsuite container 210 may include Test 210A and client library 210B. Custom services 212, 214 and 216 could be components of systems being tested. For example, if the contemplated invention were testing bitcoin, the custom services could be bitcoin nodes, or application programs that run the bitcoin protocol etc.

API container 208 operates as the coordinator of activity within each subnet 206. API container 208 enables the user's testing code written using an SDK to do the things that the user wants to do. For example, if a user wants to add a new service (e.g., any one of service 212, 214), API container 208 would be the interface component that provides the new service. In an aspect of an embodiment of the present invention, API container 208 may act as an interface between the system contemplated by an aspect of an embodiment of the present invention, with a container platform such as Docker. In performing this role, API container 208 may act to start a container, stop a container manipulate network connections between container within a subnet, start up new services etc.

Testsuite container 210 may include sets of machine code selected from the native instruction set for conducting the operations of testsuite container 210 as discussed herein. In an aspect of an embodiment of the present invention, these sets of machine code may be generated by the execution of instructions written by a user using a host software development kit (SDK). In an aspect of an embodiment of the present invention, testsuite containers 210 may include code written by users that define each test. If a user defines five tests, then there will be five testsuite containers each containing the user's code. A user, in an aspect of an embodiment of the present invention, may use the SDK to write the code for testsuite container 210. The user may be able to do so by first downloading the code dependencies from a repository and then use the SDK to write their tests. The SDK as contemplated by aspects of embodiments of the present invention, is unique in that the SDK itself allows for definition and manipulation of testbeds themselves. In an aspect of an embodiment of the present invention, the SDK comprises of code for the emulation of a subnet combined with the test logic code itself. As such, the SDK as contemplated by an aspect of an embodiment of the present invention, intrinsically links into the same software environment, the definition and manipulation of the test environment, plus the logic of the test itself. Using the SDK as contemplated by an aspect of an embodiment of the present invention, a user can simulate entire networks in an isolated fashion and run tests against them in a simple way.

In an aspect of an embodiment of the present invention, testsuite container 210 may contain user's code for starting custom services forming the networks being tested as well as logic for the tests to run.

In an aspect of an embodiment of the present invention, the client library could be in the user's software language of choice that abstracts away communication with API container 208 for subnet initialization, manipulation, and teardown.

In an aspect of an embodiment of the present invention, each SDK may include sets of machine code selected from the native instruction set for: defining core functionality, enabling definition and manipulation of subnet(s). each SDK may also include code for test logic definitions of the subnet(s) combined with orchestration and manipulation code of the subnet(s). This combination allows developers to write holistic end-to-end tests without needing to mock external components with the same level of reproducibility and reliability they normally get with unit tests.

Because there is one environment (subnet) per test, subnetworks, as contemplated by aspects of embodiments of the present invention, are entirely isolated and reproducible. This feature is critical for proper testing even when running whole-system end-to-end integration tests.

In an aspect of an embodiment of the present invention, API container 208 may include a set of machine code selected from the native instruction set of code for initializing, manipulating and tearing down of the subnet(s).

Referring back to process 100, following step 104, next, in step 106, the processor (not shown) launches API container 208 and testsuite container 210. Following this, client library 210B, in step 108, at the behest of testsuite container 210, instructs API container 208 regarding the makeup of subnet 206.

In an aspect of an embodiment of the present invention, API container 208 has a set of instructions which it understands. The contemplated invention enables the use of a user's preferred code language to communicate with API container 208 by way of importing client library 210B in the user's language of choice. Client library 210B then, by way of its code which enables its communication with API container 208, then serves as a dictionary for API container 208, thereby enabling communication between API container 208 and testsuite container 210.

In instructing API container 208 regarding the makeup of subnet 206, client library 210B informs API container 208 regarding what type of service is to be created, what parameters are associated with starting such a service such as memory, type of optimization etc. Upon receipt of these parameters, API container 208 would use the received parameters and interface with the container platform such as Docker to create the requested service.

Upon aforesaid instruction in step 108, API container 208 in step 110 then instantiates subnet container 206 by instructing testsuite container 210 to spin up or start the custom services the subnet would like to test.

In an aspect of an embodiment of the present invention, API container 208 may act as a coordinator within the subnet. In instances where any of the testsuites are to validate certain services meant to be tested, the testsuites would coordinate with API container 208 by sending the request to API container 208, which would then spin off or start the new service. For example, if an aspect of an embodiment of the contemplated invention were to test Netflix, testsuite 210 would request some new services such as a Netflix database, Netflix index service and a Netflix user interface service. As a result, API container 208 would then have these three services (i.e., Netflix database, Netflix index service and Netflix user interface service) started within subnet 206 for testing. Once these services have been spun out, the respective testsuite would then be able to communicate directly with the services and subnet 206 would then be able to test them.

Referring back to Process flow 100, following step 110, next, in step 112, Test 210A running within testsuite 210, makes calls against the network. This is the perturbation step of the overall testing process. Using the Netflix example and referring to subnet 206, once the Netflix services have been set up or spun out, TestSuite 210 may activate test 210A which may make a call to the Netflix user interface service (which, for illustrative purposes here may be referred as custom service 212) such as "Search for Ferris Bueller's Day Off" and Netflix user interface service 212 would return a response in the negative such as "Oh, no movie is found." This call made by Test 210A is represented by step 112 of process 100.

Then test 210A would execute code selected from the native instruction set to verify whether this response is expected. Test 210A would communicate with the Netflix index service (which, for illustrative purposes here may be referred as custom service 214) to determine whether custom service 212 has an index for "Ferris Bueller's Day Off?". If, for instance, custom service 214 (i.e. Netflix index service) responds affirmatively and Test 210A then inquires as to whether the Netflix database service (here custom service 216) has a database entry for "Ferris Bueller's Day Off. If custom service 216's response is in the affirmative, then Test 210A would determine the existence of a bug because the Netflix user interface service 212 is not returning expected results i.e. presence of the movie when it should be. This is the validation step of the overall testing process and is represented by step 114 of process flow 100.

Referring back to process flow 100, following the calls made by Test 210A in step 112, in step 114, Test 210A then asserts the expected responses. Next, in step 116, Test 210A completes its tests and reports its status back to initializer container 204, which, in using the Netflix example above, the status would be that there is a bug in the network as the Netflix user interface service 212 is not returning expected responses/results. Following this, API container 208, in step 118, stops subnet container 206 and, in step 120 API container 208 and testsuite container 210 exit. Next, in step 122 initializer container 204 then proceeds to tear down subnet 206. Finally, in step 124, initializer container 204 then reports the results of the tests to the user. Steps 116 through 122 represent the teardown step of the overall testing process.

FIG. 2 is also shown with launches of, according to aspects of embodiments of the present invention, API container 208 and Test 210A by initializer container 204. FIG. 2 also illustrates launches of, according to aspects of embodiments of the present invention, subnet custom services 212, 214 and 216 by API container 208. FIG. 2 also illustrates, according to aspects of embodiments of the present invention, information flows from subnet custom services 212, 214 and 216 to testsuite container 210 and information flows from testsuite container 210 to initializer container 204. It should be noted that the launches and information flows shown in FIG. 2 are illustrative only and are not meant to be limiting. It should also be noted that the numbers of elements of the system 200 shown in FIG. 2 is only meant to be illustrative only and not limiting as more or less numbers of elements are also contemplated by A further aspect of an embodiment of the present invention contemplates use of computer program product which may include a computer usable medium having control logic stored on it for causing one or more processors and, in other aspects, sub-processors to perform all operations contemplated herein.

Further aspects of embodiments of the present invention contemplate the use of computer-implemented methods for the implementation and execution of the operations contemplated and disclosed herein.

Further aspects of embodiments of the present invention contemplate the use of computer-implemented methods which perform a predefined set of basic operations in response to receiving a corresponding basic instruction selected from a predefined native instruction set of code in the implementation and execution of the operations contemplated and disclosed herein.

Aspect(s) of embodiment(s) of the present invention make use of hardware processor(s) configured to perform a predefined set of basic operations in response to receiving a corresponding basic instruction selected from a predefined native instruction set of code.

Although aspects of embodiments of the present invention have been disclosed with reference to specific forms and embodiments, it will be evident that a great number of variations may be made without departing from the spirit and scope of the present invention. For example, steps may be reversed, equivalent elements may be substituted for those specifically disclosed and certain features of the present invention may be used independently of other features—all without departing from the present invention as outlined above, in the appended drawings and the claims presented below.

What is claimed is:

1. A system for orchestration of software test environments, comprising:
   at least one hardware processor configured to perform a predefined set of basic operations in response to receiving a corresponding basic instruction selected from a predefined native instruction set of code;
   memory;
   an entry point executable code comprising a set of machine code selected from the native instruction set for launching at least one container;
   an initializer container, comprising a first set of machine code selected from the native instruction set for creating at least one subnet, a second set of machine code selected from the native instruction set for coordinating execution and launch of at least one container, wherein said initializer container is launched by execution of said entry point executable code, wherein said at least one subnet is an orchestration environment within which to run desired tests;
   at least one testsuite container, comprising of a first set of machine code selected from the native instruction set for starting at least one custom service for said at least one subnet, a second set of machine code selected from the native instruction set for running tests within said at least one subnet, wherein said first and second sets of machine code are generated by execution of a host software development kit (SDK);
   an API container comprising a set of machine code selected from the native instruction set of code for initializing, manipulating and tearing down said at least one subnet; and
   a client library comprising a set of machine code selected from the native instruction set of code for enabling interaction between said at least one testsuite container and said API container, wherein said at/east one testsuite container, API container, client library and said at least one custom service are resident within said at least one subnet.

2. The system of claim 1, wherein said host SDK comprises of a set of machine code selected from the native instruction set representing a combination of code for: test logic definitions of said at least one subnet for conducting at least one test on said at least one custom service and code for orchestration and manipulation of said at least one subnet.

3. The system of claim 1, wherein said host SDK further comprises of a set of machine code selected from the native instruction set for defining core functionality, and a set of machine code selected from the native instruction set for enabling definition and manipulation of said at least one subnet.

4. The system of claim 1, wherein said testsuite and API containers are launched by execution of said second set of machine code of said initializer container.

5. The system of claim 1, wherein launch of said API container and testsuite container prompts said client library to instruct said API container on composition of said at least one subnet.

6. A computer-implemented method of orchestrating software test environments, as executed on at least one processor configured to perform a predefined set of basic operations in response to receiving a corresponding basic instruction selected from a predefined native instruction set of code, comprising the steps of:
   launch of an initializer container by execution of an entry point executable code;
   creation, launch and operation of at least one subnet;

launch and operation of an API container;
generation and operation of at/east one testsuite container;
generation of at least one custom service; and
importation and execution of a client library, wherein execution of said client library enables interaction between said API container and said at least one testsuite container and wherein said API container, said at least one testsuite container, said client library and said at least one custom service are contained within said at least one subnet and wherein said at least one testsuite container comprises of code for conducting at least one test on said at least one custom service.

7. The computer implemented method of claim 6, further comprising the step of interaction between said client library and said API container.

8. The computer implemented method of claim 6, wherein the step of operation of said at least one testsuite container comprises the step of executing instructions written by a user using a software development kit (SDK), wherein said SDK comprises of a set of machine code selected from the native instruction set representing a combination of code for: test logic definitions of said at least one subnet for conducting at least one test on said at least one custom service and code for orchestration and manipulation of said at least one subnet.

9. The computer implemented method of claim 8, wherein said SDK further comprises of a set of machine code selected from the native instruction set for defining core functionality, and a set of machine code selected from the native instruction set for enabling definition and manipulation of said at least one subnet.

10. The computer implemented method of claim 6, wherein the step of operation of said API container further comprises the step of interacting with a subnet generation platform in providing said testsuite container with custom services.

11. The computer-implemented method of claim 6, wherein the step of operation of said testsuite container further comprises the steps of: communicating with said API container, starting custom services to be tested and running control logic for testing said custom services.

12. The computer implemented method of claim 6, wherein the step of operation of said API container further comprises the steps of initializing, manipulating and tearing down said at least one subnet.

13. A computer program product comprising a non-transitory computer readable medium having control logic stored therein for causing a processor configured to perform a predefined set of basic operations in response to receiving a corresponding basic instruction selected from a predefined native instruction set of code to orchestrating software test environments, the control logic comprising computer readable code for:

launch of an initializer container by execution of an entry point executable code;
creation, launch and operation of at least one subnet;
launch and operation of an API container;
generation and operation of at least one testsuite container;
generation of at least one custom service; and
importation and execution of a client library, wherein execution of said client library enables interaction between said API container and said at least one testsuite container and wherein said API container, said at least one testsuite container, said client library and said at least one custom service are contained within said at least one subnet and wherein said at least one testsuite comprises of code for conducting at least one test on said at least one custom service.

14. The computer program product of claim 13, further comprising computer readable code for enabling interaction between said client library and said API container.

15. The computer program product of claim 13, wherein the control logic for generation of said testsuite container comprises computer readable code for executing instructions written by a user using a software development kit (SDK), wherein said SDK comprises of a set of machine code selected from the native instruction set representing a combination of code for: test logic definitions of said at least one subnet for conducting at least one test on said at least one custom service and code for orchestration and manipulation of said at least one subnet.

16. The computer program product of claim 15, wherein said SDK further comprises of a set of machine code selected from the native instruction set for defining core functionality, and a set of machine code selected from the native instruction set for enabling definition and manipulation of said at least one subnet.

17. The computer program product of claim 13, wherein the control logic for operation of said API container further comprises computer readable code for enabling said API container interaction with a subnet generation platform in providing said testsuite with custom services.

18. The computer program product of claim 13, wherein the control logic for operation of said testsuite container further comprises computer readable code for: communicating with said API container, starting custom services to be tested and running control logic for testing said custom services.

19. The computer program product of claim 13, wherein the control logic for operation of said API container further comprises computer readable code for initializing, manipulating and tearing down said at least one subnet.

\* \* \* \* \*